March 1, 1955 G. H. RENDEL 2,703,384
APPARATUS FOR MEASURING THE THICKNESS OF NONMAGNETIC
COATINGS ON MAGNETIC MATERIAL
Filed May 25, 1950
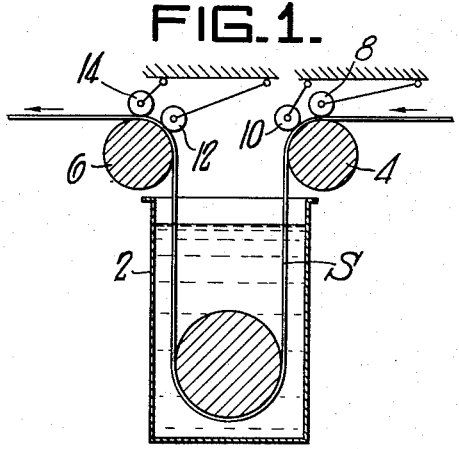
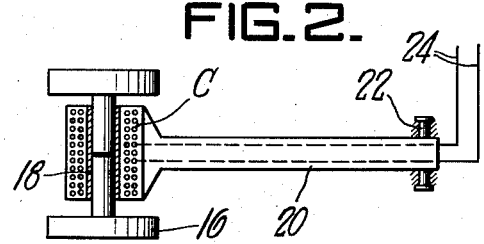
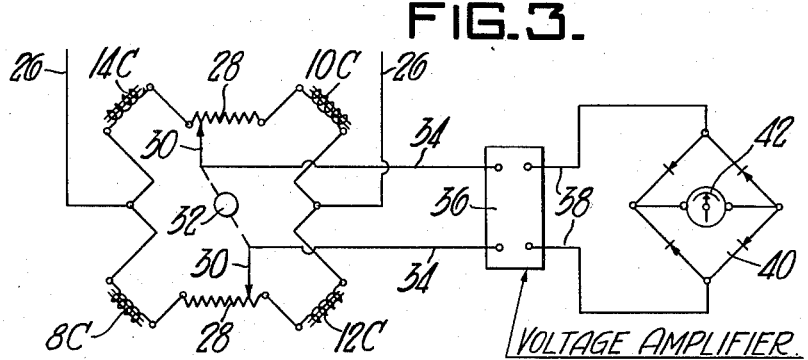
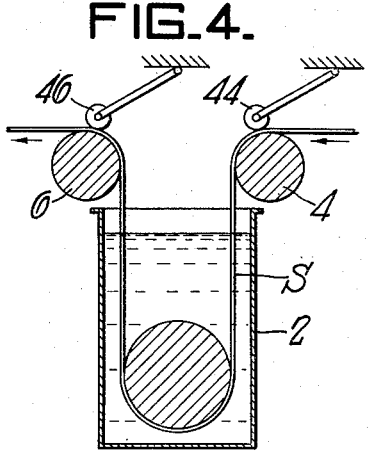
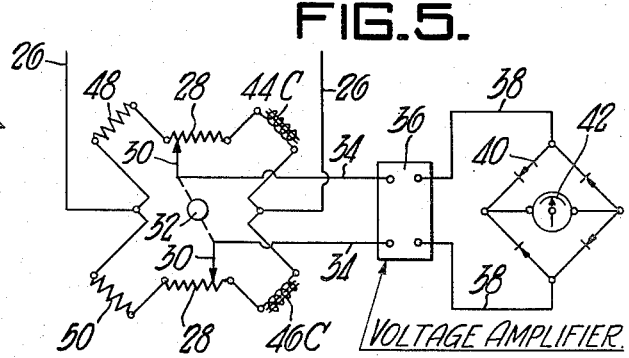
Inventor:
GEORGE H. RENDEL,
by: Donald G. Dalton
his Attorney.

United States Patent Office 2,703,384
Patented Mar. 1, 1955

2,703,384

APPARATUS FOR MEASURING THE THICKNESS OF NONMAGNETIC COATINGS ON MAGNETIC MATERIAL

George H. Rendel, Pittsburgh, Pa., assignor to United States Steel Corporation, a corporation of New Jersey Application May 25, 1950, Serial No. 164,092

10 Claims. (Cl. 324—34)

This invention relates to apparatus for measuring the thickness of nonmagnetic coatings on magnetic materials and more particularly to such apparatus for measuring the thickness of such coatings on a moving steel strip. In the past, the thickness of such coatings has been measured by the use of a magnetic gage head having an exciting winding which forms one arm of an electric bridge circuit. A balancing coil similar to the winding in the gage head forms another arm of the bridge circuit. The electric impedances of the two arms of the bridge circuit are balanced against each other. As the impedance of the gage head changes, it affects the balance of the bridge circuit and indicates the degree of unbalance on an instrument connected in circuit with the bridge network. The instrument is normally calibrated to indicate thickness of coating. I have found that such gages are subject to wide errors because of a change in temperature of the several component parts comprising the bridge circuit. Temperature changes caused by the temperature-resistance coefficient of the gage head winding affects the impedance of each winding; thus, unless compensated for temperature, the bridge network will be unbalanced causing an erroneous reading on the indicating meter. Metallurgical variations in the base material affect the permeability of the base metal. This also causes error in the gage reading. Furthermore, it was not possible to accurately measure the thickness of such coatings on a moving strip with the previously used apparatus.

It is therefore an object of my invention to provide apparatus for measuring the thickness of a nonmagnetic coating on a magnetic material, which apparatus will be relatively free of errors due to temperature changes of the several component parts of the bridge circuit and metallurgical variations in the base material.

This and other objects will be more apparent after referring to the following specification and attached drawings, in which:

Figure 1 is a schematic view showing the application of my invention to continuous strip coating apparatus;

Figure 2 is a detailed view of a magnetic head;

Figure 3 is a schematic wiring diagram of my invention;

Figure 4 is a view, similar to Figure 1, showing a second embodiment of my invention; and Figure 5 is a schematic wiring diagram of the embodiment of my invention shown in Figure 4.

Referring more particularly to the drawings, reference numeral 2 indicates a plating tank through which a strip S passes. The coating applied to the strip in tank 2 is a nonmagnetic material such as tin. The strip S passes over a guide roll 4 into the tank 2 and the coated strip passes from the tank over guide roll 6. A pair of magnets or magnetic heads 8 and 10 rest on the uncoated strip where they are in contact with the roll 4. A second pair of similar magnetic heads 12 and 14 rest on the coated strip where they are in contact with the roll 6. Each of the magnetic heads consists of a contact wheel 16 of magnetic material, such as soft steel, mounted for rotation in a nonmagnetic bearing 18. Contact wheel 16 is preferably made of two parts to permit assembly in the bearing 18. An energizing coil C surrounds the bearing 18 and is supported by an arm 20 which is pivotally mounted at 22. Wires 24 pass through the arm 20 and are connected to the coil C. As shown in Figure 3, the coils 8C, 10C, 12C and 14C of the four magnetic heads are connected in a bridge circuit with coils 8C and 10C being connected between coils 12C and 14C. A pair of lead wires 26 are connected to the bridge circuit, one between coils 8C and 14C and the other between coils 10C and 12C. The lead wires 26 are adapted to be connected to an A. C. power source (not shown). A pair of adjustable resistances 28 may be inserted in the bridge circuit, one between coils 10C and 14C and the other between coils 8C and 12C. The resistances 28 are each provided with a movable arm 30 which are preferably connected so as to be movable in unison by a knob 32. A wire 34 is connected to each of the arms 30. Since the potential across wires 34 is low, a voltage amplifier 36 may be connected to the wires 34 to amplify this voltage. Lead wires 38 from the voltage amplifier 36 are connected to the A. C. terminals of a dry-disc rectifier 40. A voltmeter 42 is connected across the D. C. terminals of rectifier 40 and is preferably calibrated to read coating thickness.

The operation of the device is as follows:

The uncoated strip S passes through the coating tank 2 and a nonmagnetic coating is applied thereto. The contact wheels of measuring heads 8 and 10 are maintained in intimate contact with the uncoated strip and the contact wheels of measuring heads 12 and 14 are maintained in similar contact with the coated strip. When the measuring heads are placed against the ferromagnetic material of the strip, magnetizing current in the energizing coil C establishes flux lines in the iron core of the measuring head which travels through the magnetic return path consisting of the ferromagnetic base material. The strength of the magnets is such that the magnetic flux is confined substantially to the base material. The reluctance of the flux path is predominantly a function of the nonmagnetic gap length of the magnetic circuit and the electric impedance of the measuring head varies as a function of the nonmagnetic gap length, that is, the thickness of the nonmagnetic coating. By measuring the difference between the total reluctance of the magnetic paths of magnets 8 and 10 and the total reluctance of the magnetic paths of magnets 12 and 14 the thickness of the nonmagnetic coating is determined. In the embodiment of Figure 3, this difference is measured by utilizing the difference in the electric impedances of the measuring heads. If all four measuring heads are placed in contact with similar uncoated magnetic material, the impedances of the measuring heads will be equal so that the bridge circuit will be balanced and there will be zero potential between wires 34. The adjustable resistances 28 are used as a zero adjuster to facilitate vernier adjustments of the gaging circuit. In case the bridge circuit is not in balance when the four measuring heads are placed in contact with similar magnetic material, the knob 32 is turned to move the arms 30 until the bridge circuit is balanced. At this time the voltmeter 42 will read zero. With the measuring heads 8, 10, 12 and 14 arranged as shown in Figures 1 and 3, the reluctance of the flux path of measuring heads 12 and 14 is increased due to the nonmagnetic gap formed by the thickness of the nonmagnetic coating. The increased reluctance in the flux paths of measuring heads 12 and 14 unbalances their respective arms in the bridge circuit, thus causing a potential to exist between wires 34. This potential is amplified by voltage amplifier 36 and transmitted through wires 38 to the dry-disc rectifier 40, thus causing a unidirectional potential to appear across the terminals of voltmeter 42. The unidirectional current flowing through the meter element causes the pointer of the instrument to deflect and indicate coating thickness. The voltage amplifier 36 need not be used when measuring relatively thick coatings. As the coating thickness varies the voltage impressed on meter 42 also varies, thus indicating the changes in thickness of the coating. The measuring heads 8, 10, 12 and 14 are preferably aligned longitudinally on the strip so that thickness variations in the strip or coating which may occur transversely of the strip will not influence the gage readings. If it is desired to determine the coating thickness across the strip width, additional measuring heads may be positioned across the width of the strip.

Figures 4 and 5 show a second embodiment of my device. In this embodiment only two magnetic heads 44 and 46 are used. Contact wheel of head 44 contacts the uncoated strip and the contact wheel of measuring head 46 contacts the coated strip. In this embodiment the energizing coils 44C and 46C are connected in a bridge circuit similar to that of Figure 3. The coils 44C and 46C are connected to each other. The other arms of the bridge are provided with resistors 48 and 50 of suitable ohmic value. One of the adjustable resistances 28 is connected between coil 44C and resistor 48 and the other variable resistance 28 is connected between coil 46C and resistor 50. The operation of this gage is similar to that described above except that there is no automatic compensation for temperature changes in the elements of the circuit. For that reason the gage is only suitable for those installations where the temperature ranges are relatively small and occur at a slow rate. Under these conditions satisfactory results can be obtained by resetting the bridge circuit for different temperatures by means of the variable resistances 28.

While two embodiments of my invention have been shown and described, it will be apparent that other adaptations and modifications may be made without departing from the scope of the following claims.

I claim:

1. Apparatus for measuring the thickness of a non-magnetic coating applied to a moving strip of magnetic material, which apparatus comprises a roll at the entry end of the coating apparatus over which the strip passes, a first magnet adjacent said roll adapted to contact the uncoated strip on the side opposite said roll, a roll at the exit end of the coating apparatus over which the coated strip passes, a second magnet adapted to contact the coated strip on the side opposite said second roll, and means for measuring the difference in reluctance of the magnetic paths of the two magnets to determine the thickness of said coating.

2. Apparatus for measuring the thickness of a non-magnetic coating applied to a moving strip of magnetic material, which apparatus comprises a roll at the entry end of the coating apparatus over which the strip passes, a first magnetic head adjacent said roll adapted to contact the uncoated strip on the side opposite said roll, a roll at the exit end of the coating apparatus over which the coated strip passes, a second magnetic head adjacent said second roll adapted to contact the coated strip on the side opposite said second roll, each of said magnetic heads including a coil, said coils being connected in a bridge circuit with the first and second coils being connected to each other, a third coil in said bridge circuit, a fourth coil in said bridge circuit, said third and fourth coils being connected to each other and to said first and second coils respectively, a pair of lead wires one connected to the bridge circuit between the first and second coils and the other connected to the bridge circuit between the third and fourth coils, said lead wires being adapted to be connected to an A. C. power source, a second pair of wires one connected between the first and third coils and the other connected between the second and fourth coils, and means for measuring the potential between the second pair of wires.

3. Apparatus for measuring the thickness of a non-magnetic coating applied to a moving strip of magnetic material, which apparatus comprises a roll at the entry end of the coating apparatus over which the strip passes, a first magnetic head adjacent said roll adapted to contact the uncoated strip on the side opposite said roll, a roll at the exit end of the coating apparatus over which the coated strip passes, a second magnetic head adjacent said second roll adapted to contact the coated strip on the side opposite said second roll, each of said magnetic heads including a coil, said coils being connected in a bridge circuit with the first and second coils being connected to each other, a third coil in said bridge circuit, a fourth coil in said bridge circuit, said third and fourth coils being connected to each other and to said first and second coils respectively, a pair of lead wires one connected to the bridge circuit between the first and second coils and the other connected to the bridge circuit between the third and fourth coils, said lead wires being adapted to be connected to an A. C. power source, a second pair of wires one connected between the first and third coils and the other connected between the second and fourth coils, a rectifier, the A. C. terminals of the rectifier being connected to the second pair of wires, and a voltmeter connected across the D. C. terminals of the rectifier.

4. Apparatus for measuring the thickness of a non-magnetic coating applied to a moving strip of magnetic material which apparatus comprises a roll at the entry end of the coating apparatus over which the strip passes, a first magnetic head adjacent said roll adapted to contact the uncoated strip on the side opposite said roll, a roll at the exit end of the coating apparatus over which the coated strip passes, a second magnetic head adjacent said second roll adapted to contact the coated strip on the side opposite said second roll, each of said magnetic heads including a coil, said coils being connected in a bridge circuit with the first and second coils being connected to each other, a third coil in said bridge circuit, a fourth coil in said bridge circuit, said third and fourth coils being connected to each other and to said first and second coils respectively, a pair of lead wires one connected to the bridge circuit between the first and second coils and the other connected to the bridge circuit between the third and fourth coils, said lead wires being adapted to be connected to an A. C. power source, a pair of adjustable resistances one between the first and third coils and the other between the second and fourth coils, a movable arm for each of the resistances, a rectifier, the A. C. terminals of the rectifier being connected to said movable arms, and a voltmeter connected across the D. C. terminals of the rectifier.

5. Apparatus for measuring the thickness of a non-magnetic coating applied to a moving strip of magnetic material, which apparatus comprises a roll at the entry end of the coating apparatus over which the strip passes, a pair of magnets adjacent said roll adapted to contact the uncoated strip on the side opposite said roll, a roll at the exit end of the coating apparatus over which the coated strip passes, a second pair of similar magnets adjacent said second roll adapted to contact the coated strip on the side opposite said second roll, and means for measuring the difference between the total reluctance of the magnetic paths of the first pair of magnets and the total reluctance of the magnetic paths of the second pair of magnets to determine the thickness of said coating.

6. Apparatus for measuring the thickness of a non-magnetic coating applied to a moving strip of magnetic material, which apparatus comprises a roll at the entry end of the coating apparatus over which the strip passes, a first magnetic head adjacent said roll adapted to contact the uncoated strip on the side opposite said roll, a second magnetic head adjacent said first head adapted to contact the uncoated strip on the same side as the first magnetic head, a roll at the exit end of the coating apparatus over which the coated strip passes, a third magnetic head adjacent said second roll adapted to contact the coated strip adjacent said second roll, a fourth magnetic head adjacent said third head and adapted to contact the coated strip on the same side as the third magnetic head, each of said magnetic heads including a coil, said coils being connected in a bridge circuit with the first and second coils being connected between the third and fourth coils, a pair of lead wires one connected to the bridge circuit between the first and third coils and the other connected to the bridge circuit between the second and fourth coils, said lead wires being adapted to be connected to an A. C. power source, a second pair of wires one connected between the first and fourth coils and the other between the second and third coils, and means for measuring the potential between the second pair of wires.

7. Apparatus for measuring the thickness of a non-magnetic coating applied to a moving strip of magnetic material, which apparatus comprises a roll at the entry end of the coating apparatus over which the strip passes, a first magnetic head adjacent said roll adapted to contact the uncoated strip on the side opposite said roll, a second magnetic head adjacent said first head adapted to contact the uncoated strip on the same side as the first magnetic head, a roll at the exit end of the coating apparatus over which the coated strip passes, a third magnetic head adjacent said second roll adapted to contact the coated strip on the side opposite said second roll, a fourth magnetic head adjacent said third head and adapted to contact the coated strip on the same side as the third magnetic head, each of said magnetic heads including a coil, said coils being connected in a bridge circuit with the first and second coils being connected between the third and fourth coils, a pair of lead wires one connected to the bridge circuit between the first and third coils and the other connected to the bridge circuit between the second and fourth coils, said lead wires being adapted to be connected to an A. C. power source, a second pair of wires one connected between the first and fourth coils and the other between the second and third coils, a rectifier, the A. C. terminals of the rectifier being connected to the second pair of wires, and a voltmeter connected across the D. C. terminals of the rectifier.

8. Apparatus for measuring the thickness of a non-magnetic coating applied to a moving strip of magnetic material, which apparatus comprises a roll at the entry end of the coating apparatus over which the strip passes, a first magnetic head adjacent said roll adapted to contact the uncoated strip on the side opposite said roll, a second magnetic head adjacent said first head and adapted to contact the uncoated strip on the same side as the first magnetic head, a roll at the exit end of the coating apparatus over which the coated strip passes, a third magnetic head adjacent said second roll adapted to contact the coated strip on the side opposite said second roll, a fourth magnetic head adjacent said third head and adapted to contact the coated strip on the same side as the third magnetic head, each of said magnetic heads including a coil, said coils being connected in a bridge circuit with the first and second coils being connected between the third and fourth coils, a pair of lead wires one connected to the bridge circuit between the first and third coils and the other connected to the bridge circuit between the second and fourth coils, said lead wires being adapted to be connected to an A. C. power source, a pair of adjustable resistances one between the first and fourth coils and the other between the second and third coils, a movable arm for each of the resistances, a rectifier, the A. C. terminals of the rectifier being connected to the second pair of wires, and a voltmeter connected across the D. C. terminals of the rectifier.

9. Apparatus for measuring the thickness of a non-magnetic coating applied to a moving strip of magnetic material, which apparatus comprises a roll at the entry end of the coating apparatus over which the strip passes, a first magnetic head adjacent said roll adapted to contact the uncoated strip on the side opposite said roll, a second magnetic head adjacent said first head adapted to contact the uncoated strip on the same side as the first magnetic head, a roll at the exit end of the coating apparatus over which the coated strip passes, a third magnetic head adjacent said second roll adapted to contact the coated strip on the side opposite said second roll, a fourth magnetic head adjacent said third head adapted to contact the coated strip on the same side as the third magnetic head, each of said magnetic heads including a coil, said coils being connected in a bridge circuit with the first and second coils being connected between the third and fourth coils, a pair of lead wires one connected to the bridge circuit between the first and third coils and the other connected to the bridge circuit between the second and fourth coils, said lead wires being adapted to be connected to an A. C. power source, a pair of adjustable resistances one between the first and fourth coils and the other between the second and third coils, a movable arm for each of the resistances, a voltage amplifier connected to said movable arms, a rectifier, the A. C. terminals of the rectifier being connected to the voltage amplifier, and a voltmeter connected across the D. C. terminals of the rectifier.

10. Apparatus for measuring the thickness of a non-magnetic coating applied to a moving strip of magnetic material, which apparatus comprises a roll at the entry end of the coating apparatus over which the strip passes, at least one magnet adjacent said roll adapted to contact the uncoated strip on the side opposite said roll, a roll at the exit end of the coating apparatus over which the coated strip passes, at least one magnet adapted to contact the coated strip on the side opposite said second roll, and means responsive to the difference in reluctance of the magnetic paths of the magnets for determining the thickness of said coating.

References Cited in the file of this patent

UNITED STATES PATENTS

| Re. 21,003 | Knerr et al. | Feb. 14, 1939 |
|---|---|---|
| 1,895,118 | Allen | Jan. 24, 1933 |
| 1,925,904 | Mayne | Sept. 5, 1933 |
| 2,058,518 | Schuster | Oct. 27, 1936 |
| 2,104,646 | Greenslade | Jan. 4, 1938 |
| 2,269,152 | Hathaway | Jan. 6, 1942 |
| 2,370,609 | Wilson et al. | Feb. 27, 1945 |
| 2,503,720 | Gieseke | Apr. 11, 1950 |
| 2,503,721 | Angell | Apr. 11, 1950 |
| 2,540,588 | Long | Feb. 6, 1951 |
| 2,565,121 | Clardy et al. | Aug. 21, 1951 |